United States Patent [19]

Eberle et al.

[11] 4,358,170
[45] Nov. 9, 1982

[54] GROUP STORAGE TOWER FOR STORING STACKS, GROUPS OF ELEMENTS OR PASTED BATTERY PLATES IN A DUST-FREE MANNER

[75] Inventors: William J. Eberle, Reading, Pa.; Harry M. Channing, South Lake Tahoe, Calif.

[73] Assignee: General Battery Corporation, Reading, Pa.

[21] Appl. No.: 101,908

[22] Filed: Dec. 10, 1979

Related U.S. Application Data

[63] Continuation-in-part of Ser. No. 59,501, Jul. 23, 1979, abandoned.

[51] Int. Cl.³ .................. F26B 13/10; A47B 77/08
[52] U.S. Cl. ............................ 312/268; 312/236; 34/189
[58] Field of Search .............. 312/268, 269, 270, 134, 312/97, 97.1, 91, 236; 34/189

[56] References Cited

U.S. PATENT DOCUMENTS

| | | |
|---|---|---|
| 177,032 | 5/1876 | Tiffany .................. 34/189 |
| 217,288 | 7/1879 | Hopkins ................. 34/189 |
| 339,874 | 4/1886 | Gathmann ............... 34/189 |
| 1,691,186 | 11/1928 | Greth .................. 312/268 |
| 2,030,741 | 2/1936 | Bodine ................. 312/268 |
| 2,976,100 | 3/1961 | Wigley ................. 312/268 |
| 3,141,123 | 7/1964 | Olson .................. 312/268 |
| 3,589,785 | 6/1971 | Appleby ................ 312/268 |
| 3,999,475 | 12/1976 | Roderick ............... 312/236 |
| 4,026,617 | 5/1977 | Bosio et al. ........... 312/268 |

FOREIGN PATENT DOCUMENTS 557626  8/1923  France ..................... 34/189

Primary Examiner—Victor N. Sakran
Attorney, Agent, or Firm—Benasutti Associates, Ltd.

[57] ABSTRACT

A vertical tower support is provided within a vertical dust collection channel that is attached to a dust collecting conduit. On either side of the vertical tower support within the channel are a plurality of modified battery cases that are attached to chains disposed around upper and lower wheels or sprockets and which travel in a carousel-like fashion around the vertical tower. A small opening on one side of the channel is provided so that stacks of battery plates may be inserted between the partitions of the modified cases within the channel. A motor activated by a manual push button, foot pedal shut-off, or, alternatively, a limit switch allows indexing of only one case at a time and is provided so that the cases will be advanced to receive stacks of battery plates as needed. An air blow-off mechanism triggered by an electric eye and limit switch combination located adjacent the top of the dust collection channel blows oxide dust from the empty modified cases. The build-up of oxide dust is thereby prevented and the dust shed by the plates during storage is safely eliminated by withdrawing the dust-laden area in the channel through the plant dust collection system.

17 Claims, 3 Drawing Figures

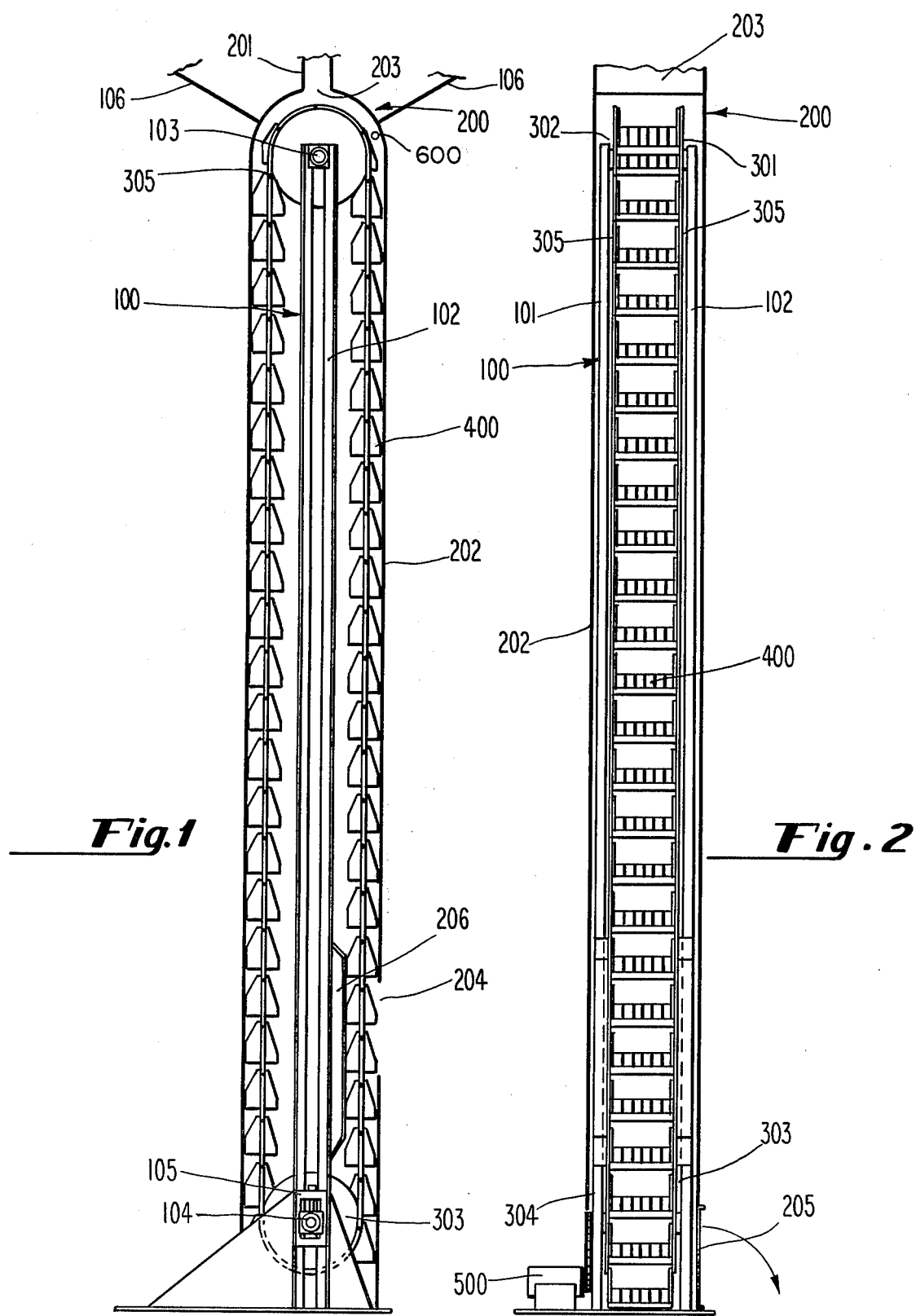

GROUP STORAGE TOWER FOR STORING STACKS, GROUPS OF ELEMENTS OR PASTED BATTERY PLATES IN A DUST-FREE MANNER

CROSS REFERENCE TO THE RELATED APPLICATION

This application is a continuation-in-part of our prior co-pending application Ser. No. 59,501 filed July 23, 1979, now abandoned, entitled "GROUP STORAGE TOWER FOR STORING STACKS, GROUPS OF ELEMENTS OR PASTED BATTERY PLATES IN A DUST FREE MANNER", which application is incorporated by reference as if fully set forth herein.

BACKGROUND OF THE INVENTION

The present invention relates to an apparatus for storing battery plates, and in particular, the invention relates to an apparatus for storing battery plates vertically in the form of stacks or groups in a manner which is intended to minimize the amount of lead-oxide dust which may be introduced into the atmosphere of a battery plant during the battery assembly process.

One of the major pollution problems which presents itself inside a battery production plant is the dispersion of lead-oxide dust particles into the air before the battery plates are assembled into the battery casings. This problem generally occurs because there is usually a problem in coordinating the production of the lead elements into battery stacks or battery elements and either burning or finally assembling those elements into completed batteries. During the ensuing period between the production of battery elements and the burning or assembling, the lead plates oxidize rapidly, thereby creating lead-oxide particles which may fall away from the lead elements and become the dust particles which contaminate the air.

Through effective storage of the pre-burned or pre-assembled battery elements, much of the lead-oxide dust pollution might be eliminated. However, battery stocks or elements are usually stored in the battery plant by merely placing those stacks onto a palette or other similar flat surface where the lead-oxide dust is free to form and contaminate the surrounding air. Also, particularly with battery stacks, the stacking of more than one stack deep on the flat surface tends to lead to confusion in the number of plates per stack to be burned; thereby necessitating a great deal of flat surface storage area which further enhances the lead-oxide contamination possibilities.

Attempts have been made to vent these storage areas and collect the lead-oxide particles, but many problems arise when the stacks are vented in this flat position. Therefore, various attempts have been pursued toward immediately burning the stacks so that they may be stored otherwise than in single flat layers. The most effective alternative seems to be to burn the stacks and then assemble them into battery cases.

SUMMARY OF THE INVENTION

The present invention is designed to provide a new storage system for stacks of battery plates. It is, therefore a primary objective of this invention to provide a group storage tower wherein the stacks of battery plates may be stored prior to burning in a simple, effective, and dust-free manner.

In the present invention, a vertical tower support is provided within a vertical dust collection channel that is attached to a dust collecting conduit. On either side of the vertical tower support within the channel are a plurality of modified battery cases that are attached to chains disposed around upper and lower spools or sprockets and which travel in a carousel-like fashion around the vertical support. A small opening at chest-height on one side of channel is provided so that sticks of battery plates may be stored between the partitions of the modified cases within the channel. A motor activated by a manual push button, foot pedal shut-off, or, alternatively, but a limit switch allows indexing of only one case at a time and is provided so that the cases will be advanced to receive stacks of battery plates as needed. An air blow-off mechanism triggered by an electric eye and limit switch combination located adjacent the top of the dust collection channel blows oxide dust from the empty modified cases. The build-up of oxide dust is thereby prevented and the dust shed by the plates during storage is safely eliminated by withdrawing the dust-laden area in the channel through the conduit into the plant dust collection system.

BRIEF DESCRIPTION OF THE DRAWINGS

The above and further objects of the present invention will become more apparent from the following detailed description taken in conjunction with the formal drawings, wherein:

FIG. 1 is a side section view of the invention;

FIG. 2 is a front section view of the invention; and

DETAILED DESCRIPTION OF THE INVENTION

Figure 3:
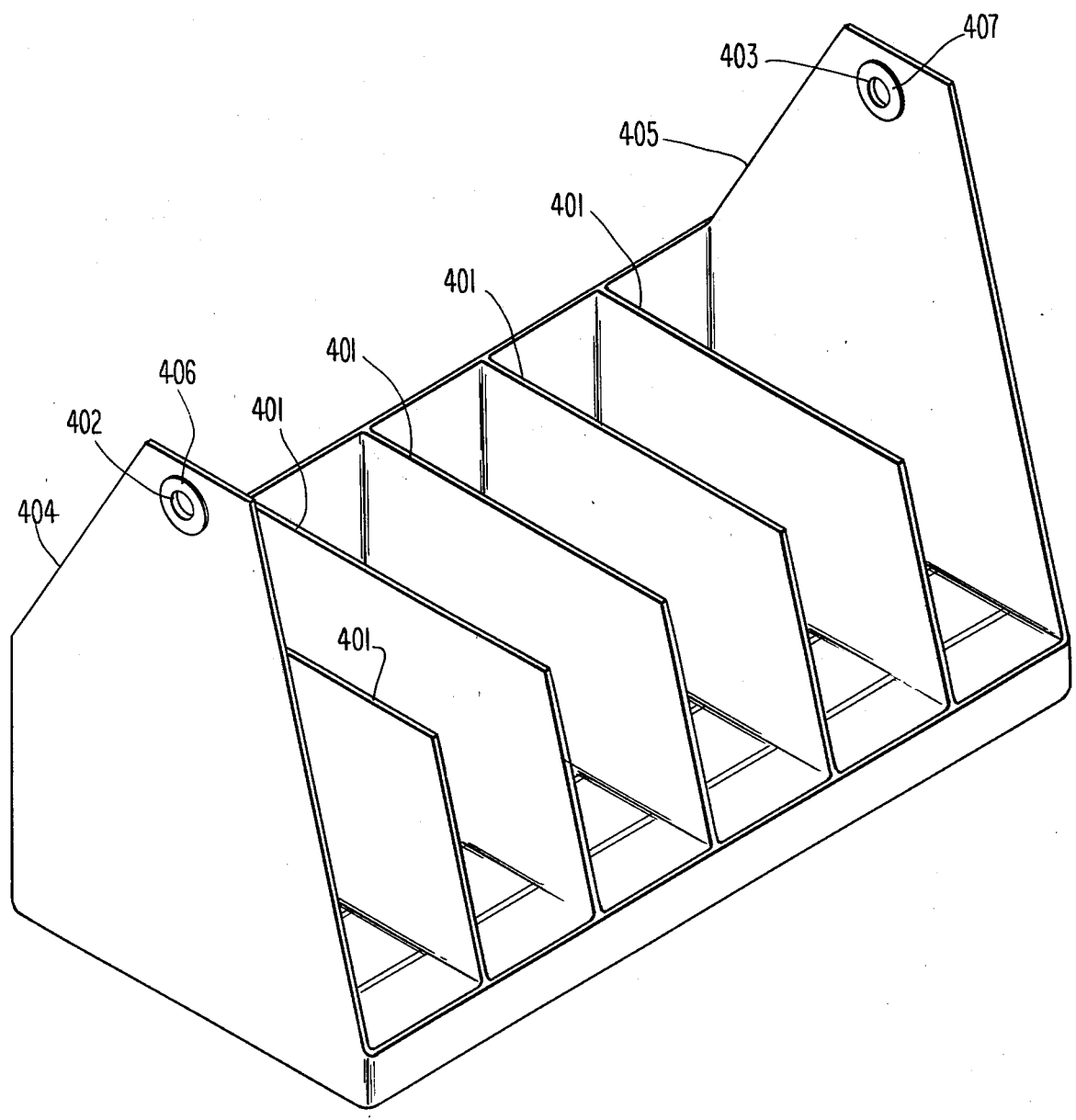
FIG. 3 is a perspective view of the modified battery casing used to hold the battery stacks in the invention.

Although a specific form of the invention have been selected for illustration in the drawings, and the following description is drawn in specific terms for the purpose of describing the invention, this description is not intended to limit the scope of the invention which is defined in the appended claims.

Referring principally to FIGS. 1 and 2, the basic embodiment of the present invention is disclosed. A main support frame 100 is vertically positioned within a vertical dust collection channel 200. Wheels or sprockets 301–304 are mounted on the support frame at the top and bottom thereof, respectively. Extending between and around these wheels are chains 305 onto which are pivotally affixed a plurality of modified battery cases 400. A motor 500 is connected to the lower wheels to rotate them, and ultimately the cases 400 affixed to the chains 305. Within the channel 200 is at least one air blow-off mechanism 600 directed toward the cases on the chains to direct a stream of air thereagainst for removing lead-oxide particles therefrom, and also associated with the channel 200 is a dust collecting conduit 201 which is connected to an exhaust system (such as the dust collection system for the battery plant) for withdrawing the lead-oxide particle-laiden air from the channel.

The dust collection channel 200 is essentially a vertical metal hood 202 surrounding the vertical support frame 100 and the modified cases 400. At the top of the hood 202 is a first opening 203 to which the dust collecting conduit 201 is attached. The conduit is preferably connected to an exhaust system which will withdraw the air from the hood and collect the lead-oxide particles from the air so removed. On the front side of the hood 202, as shown in FIG. 1, is a second opening 204 which allows access into the hood and to the modified cases therein so that battery stacks may be placed into the modified battery cases 400 within the hood. This opening 204 is relatively small and at approximately chest height, thereby making it easy for personnel to load and unload stacks from the cases. Finally, a door or hatch 205 is provided at the bottom of the hood to allow the heavier lead-oxide particles which are not carried by the air and which fall to the bottom of the hood to be removed from the hood.

The support frame 100 has at least two parallel upright or vertical members 101, 102 spaced from each other. Base members 101', 102' are affixed to the bottoms of the vertical members in order to stabilize them. Mounted between the two vertical members 101, 102 at the top and bottom, respectively, are two horizontal members 103, 104. Rotatably mounted on these horizontal members are the wheels or sprockets 301–304. The lower horizontal member 104, is adjustable vertically at 105 in order to adjust the tension on the chains 305 extending around the wheels.

Additional horizontal support members may be provided as necessary in order to further stabilize the vertical members, and a stationary back brace 206 may be provided between the vertical members at the second opening 204 through the hood in order to prohibit backward movement of the battery cases mounted on the chains while the battery stacks are being added to or removed therefrom. There may also be provided additonal support braces 106 at the top of the vertical supports which extend through the hood and fasten to the ceiling.

The motor 500 is any electric, pneumatic, or other type of motor which will turn the wheels when the cases mounted on the chains are fully loaded. Many ways of connecting the motor to ultimately rotate the wheels and chains are possible and this ability is well within the knowledge of one skilled in the art. Just as examples, the motor might rotate one or both of the lower wheels rotatably mounted on the lower horizontal brace, or the wheels might be fixed to a horizontal brace which is rotatable and moved by the electric motor.

The motor 500 may be activated by a manual push-button, a foot pedal on-off switch or even by a limit switch which detects the presence of a casing at the second opening and automatically indexes the movement of the motor. Of course, the motor may also operate on a timed on-off cycle which allows sufficient time for removal and/or insertion of battery stacks into the modified cases.

At the top of the hood is the air blow-off mechanism which directs a stream of compressed air against each passing case. The flow of air is triggered by an electric eye and limit switch combination near the top of the hood. This combination causes the air supply to flow and blow the oxide dust from the modified case only when the case reaches the required locations, as sensed by the limit switch, and when the case is empty, as sensed by the electric eye. In this manner, the dust which collects on the cases from the storage of the plates is removed and is safely withdrawn through the conduit by the dust collection system.

As previously discussed, the modified battery cases 400 are pivotally mounted between the two chains which extend around the top and bottom wheels. When the chains and wheels move, the cases move as well, and because of the pivotal mounting feature, the cases always remain vertical. FIG. 3 shows the modified case 400. This case is fundamentally a regular battery case which has been cut-down or modified as shown so that it is possible to slip the stacks of battery plates being stored inbetween the regularly spaced dividers 401 of the battery case. Openings 402, 403 in each of the sidewalls 404, 405 have grommets 406, 407 fitted therethrough to reinforce the case structure and prevent the openings from weakening at this point where they are connected to the chairs due to the swinging motion of the pivotal mounting and the downward force imparted due to the weight of the plates in the case. The bottom of the case has also been modified to make it smooth and to eliminate the "rest ups", ridges which usually are found in the bottom of battery cases, so that lead-oxide particles will not end up being collected between the ridges where the flow of air from the air blow-off source would be enhibited. One way to achieve this level surface is to simply fill the bottom of the case with epoxy up to the level of the ridges and allow the epoxy to set up or harden.

In use, the motor causes the wheels and chains to rotate, and thereby causes the cases to pass behind the second opening. When a case is at the opening, stacks of plates can be inserted into or removed from the cases. And when the cases are empty, the air blow-off system is activated to blow the oxide dust from the cases into the air within the hood so that it can be removed by the dust collection system.

Because of the tall, vertical arrangement, many plates can be stored in a small area without the confusion which usually results when the plates are stored on a flat surface, since each stack of plates is fitted between the dividers of the individual modified cases. Moreover, because of the hood surrounding the apparatus which is connected to an exhaust or dust removal system, the lead-oxide dust which might otherwise contaminate the air in the storage area is safely carried away.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and it is not intended to limit the scope of the invention described and claimed herein.

What is claimed is:

1. A dust-confining storage apparatus for storing a plurality of stacks of battery plates, said apparatus comprising:
   (a) frame means for providing a vertical support;
   (b) storage means mounted and vertically rotatable about said frame means for holding said battery plates therein;
   (c) hood means
       comprising a vertical cover surrounding said frame means and said storage means,
       said cover having a first opening in the top thereof which is adapted to be connected to an exhaust system, and further having a second opening in the side thereof through which battery plates can be inserted into said storage means within said cover, wherein said cover further includes a hatch at the bottom thereof for access into the bottom interior of said cover;

(d) air flow means;

(e) means for selectively activating said air flow means to direct air against said vertically rotatable storage means upon reaching a specified location in the vicinity of said exhaust;

(f) said selective supplying of air flow being directed against said storage means for removing lead-oxide dust therefrom to allow said dust to be safely removed into said exhaust; and (g) heavier lead-oxide dust particles which cannot be removed by said exhaust dropping to the ground within said vertical cover such that said particles can be easily removed through said hatch.

2. An apparatus as claimed in claim 1, wherein said frame means is comprised of:

(a) at least one vertical support; and (b) a plurality of rotatable wheel members, at least one at the top and one at the bottom of said vertical support.

3. An apparatus as claimed in claim 2, wherein said storage means is comprised of:

(a) at least two endless chains spaced from each other and mounted between said top and bottom wheel members and movable with the rotation thereof; and (b) plate holder means connected between said chains and movable therewith for holding said battery plates therein.

4. An apparatus as claimed in claim 3, wherein said plate holder means is comprised of a container having a plurality of vertical spaced dividers therein pivotally mounted between said chains.

5. An apparatus as claimed in claim 4, wherein said container is a modified battery case.

6. An apparatus as claimed in claim 5, wherein said battery case has a flat bottom surface for receiving said battery plates thereon.

7. An apparatus as claimed in claim 1, further comprising motor means connected to said frame means for rotating said storage means about said frame means.

8. An apparatus as claimed in claim 7, wherein said motor means is comprised of:

(a) an electric motor connected to said frame means; and (b) switch means for selectively operating said electric motor.

9. An apparatus as claimed in claim 1, wherein said air flow means is comprised of:

(a) an air blow-off mechanism adjacent said storage means near the top of said hood means, said blow-off mechanism being adapted to be connected to a compressed air source; and (b) switching means for activating said air blowoff mechanism upon detecting said storage means and determining whether battery plates are contained therein.

10. An apparatus as claimed in claim 9, wherein said switch means is comprised of:

(a) a limit switch to sense the presence of said storage means; and (b) an electric eye to determine whether battery plates are contained in the storage means sensed by said limit switch.

11. An apparatus as claimed in claim 1, further comprising brace means connected to said frame means and extending upward through said hood means for bracing said frame means to a surface above said hood means.

12. The apparatus of claim 1 wherein said storage means is comprised of:

(a) an endless conveyor means; and (b) plate holder means affixed to said conveyor and movable therewith.

13. The apparatus of claim 12 wherein said plate holder means is comprised of:

(a) container means having a plurality of vertical dividers therein, said container means pivotally affixed to said conveyor means.

14. The apparatus of claim 1 wherein said hood means further comprises:

an aperture dimensioned for permitting access to said storage means whereby battery plates may be inserted and removed from said storage means.

15. The apparatus of claim 1 wherein said air flow means further comprises:

an air flow means position adjacent to said connection to an exhaust means; and a source of compressed air connected to said air flow means.

16. The apparatus of claim 15 wherein said air flow means further comprises:

switch means for controlling said air flow means and activating said air flow means upon detecting the absence of battery plates within said storage means.

17. The apparatus of claim 16 wherein said switch means is comprised of:

(a) a limit switch for sensing the presence of said storage means; and (b) a photoelectric means for determining whether battery are contained with said storage means.

* * * * *